(12) United States Patent
Kumagai et al.

(10) Patent No.: US 6,728,418 B1
(45) Date of Patent: Apr. 27, 2004

(54) IMAGE READ APPARATUS AND METHOD THAT CAN OBTAIN FAVORABLE READOUT IMAGE

(75) Inventors: Makoto Kumagai, Toyokawa (JP);
Katsuaki Tajima, Toyokawa (JP);
Hidekazu Takahama, Nagoya (JP);
Taisuke Akahori, Toyokawa (JP);
Hideaki Mizuno, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 645 days.

(21) Appl. No.: 09/675,217

(22) Filed: Sep. 29, 2000

(30) Foreign Application Priority Data

Sep. 30, 1999 (JP) ............................ 11-278582

(51) Int. Cl.[7] .......................... G06K 9/00; G06K 9/40; G06K 9/68
(52) U.S. Cl. ...................... 382/275; 382/172; 382/218
(58) Field of Search ................................ 382/171, 172, 382/173, 181, 218, 254, 275, 312, 300, 318; 358/1.6, 1.9, 403, 406, 487, 505, 506, 530

(56) References Cited

U.S. PATENT DOCUMENTS

| | | | | |
|---|---|---|---|---|
| 4,454,541 A | * | 6/1984 | Duschl | 348/125 |
| 4,734,787 A | * | 3/1988 | Hayashi | 358/409 |
| 4,783,823 A | * | 11/1988 | Tasaki et al. | 382/116 |
| 4,864,628 A | * | 9/1989 | Scott | 382/197 |
| 5,113,365 A | * | 5/1992 | Yang | 708/801 |
| 5,592,218 A | * | 1/1997 | Ochiai et al. | 348/110 |
| 6,583,896 B1 | * | 6/2003 | Suzuki et al. | 358/487 |

FOREIGN PATENT DOCUMENTS

| | | |
|---|---|---|
| JP | 6-70099 | 3/1994 |
| JP | 7-121657 | 5/1995 |
| JP | 9-27910 | 1/1997 |
| JP | 11-55474 | 2/1999 |

* cited by examiner

*Primary Examiner*—Andrew W. Johns
*Assistant Examiner*—Amir Alavi
(74) *Attorney, Agent, or Firm*—McDermott, Will & Emery

(57) ABSTRACT

An image read apparatus includes a group of CCDs reading out a document image, a data processing unit, a line buffer to delay data to obtain data of the same pixel, a comparison unit comparing data of the same pixel, a data table in which a threshold value that becomes the reference of comparison is stored in correspondence with each type of mode, a threshold value set unit referring to the data table to set the threshold value, a determination unit receiving the comparison result with the threshold value from the comparison unit to determine and control data to be sent downstream, and an averaging unit averaging the data sent from the determination unit to output the average as image data. An image read apparatus is provided that can prevent generation of a black streak or a white streak on a readout image caused by the presence of dust at the readout position, and that can improve the picture quality of the entire image.

18 Claims, 13 Drawing Sheets

| DUST MODE | PICTURE QUALITY MODE | EXPOSURE MODE | THRESHOLD VALUE |
|---|---|---|---|
| BLACK DUST | TEXT MODE | LIGHTEST MODE | $a_2$ |
| | | MIDDLE MODE | $a_0$ |
| | | DARKEST MODE | $a_1$ |
| | PHOTOGRAPH MODE | LIGHTEST MODE | $c_2$ |
| | | MIDDLE MODE | $c_0$ |
| | | DARKEST MODE | $c_1$ |
| WHITE DUST | TEXT MODE | LIGHTEST MODE | $b_2$ |
| | | MIDDLE MODE | $b_0$ |
| | | DARKEST MODE | $b_1$ |
| | PHOTOGRAPH MODE | LIGHTEST MODE | $d_2$ |
| | | MIDDLE MODE | $d_0$ |
| | | DARKEST MODE | $d_1$ |

IMAGE READ APPARATUS AND METHOD THAT CAN OBTAIN FAVORABLE READOUT IMAGE

This application is based on Japanese Application No. 11-278582 filed in Japan, the contents of which are hereby incorporated by reference.

BACKGROUND OF THE INVENTION

1. Field of the Invention

The present invention relates to an image read apparatus and an image read method. More particularly, the present invention relates to an image read apparatus and method to prevent generation of a black streak and the like in the readout image caused by dust or foreign objects in an image read apparatus that reads out an image by moving a document with respect to a reader.

2. Description of the Related Art

In a conventional image read apparatus such as a digital copy machine, the so-called flow-shooting technique is employed. By this technique, an image is read out by moving the document original with respect to a fixed reader. The reader itself is not moved. In the case where dust is located at the readout position, the reader will constantly read out also the dust during the flow of the document. The dust will be recognized as a black streak or white streak (the terms "black streak" and "white streak" also include dotted lines and the like), whereby a black streak or a white streak will be generated in the sub-scanning direction of the readout image, and in turn, in the output image.

To solve this problem, Japanese Patent Laying-Open No. 6-70099 discloses the technique set forth in the following.

FIG. 15 is a block diagram showing a schematic structure of an image read apparatus of the prior art. Referring to FIG. 15, the image read apparatus of the conventional art includes a plurality of lines of a CCD (Charge Coupled Device) 151 to read the same position of a document with a predetermined time difference, a line buffer memory 152 temporarily storing data output from CCD 151 to cancel the time difference between each CCD to obtain data corresponding to the same position in the document, and a majority decision calculation unit 153 to carry out decision by majority of data for the input same position.

Majority decision calculation unit 153 outputs the most frequent value out of the input data as the proper image data. Therefore, the data corresponding to the readout of dust is not output as image data. Thus, generation of a black streak corresponding to dust is prevented.

This conventional image read apparatus obtains the correct binary image data by calculating the majority of the binary data. Application thereof is difficult in the case of multi-bit data.

It is to be noted that this conventional image read apparatus simply employs any one data out of the data output from a plurality of CCD 151. The usage of the plurality of CCD 151 provides only the advantage of preventing generation of a black streak, and could not improve the picture quality of the entire image.

SUMMARY OF THE INVENTION

An object of the present invention is to provide an image read apparatus and method that can prevent generation of a black or white streak on a readout image caused by the presence of dust at the readout position, and that can improve the picture quality of the entire image.

The above object of the present invention can be achieved by an image read apparatus of the present invention.

According to an aspect of the present invention, an image read apparatus includes an image reader reading out an image while a document is moved. The image reader includes a plurality of fixed read units having a different readout position with respect to the moving direction of a document. The image read apparatus also includes a determination unit determining unnecessary data from the read data of each read unit, and an averaging unit averaging the read data of each read unit other than the unnecessary data.

According to the present invention, unnecessary data corresponding the readout of dust out of the readout data from the plurality of read units is determined, and the read data other than the determined unnecessary data are averaged. Thus, an image read apparatus that can prevent generation of a black or white streak on a readout image caused by the presence of dust at the read position, and that can improve the picture quality of the entire image with the read data averaged can be provided.

Preferably, the averaging unit adds the read data of each reader for averaging. The averaging process is facilitated since the read data of each read unit is added and averaged.

Preferably, the determination unit determines the unnecessary data by comparing the value of the read data of the read unit with a predetermined threshold value.

Thus, unnecessary data can be determined easily and appropriately since unnecessary data is determined according to comparison with a predetermined threshold value.

Preferably, the read unit is formed of a line sensor extending in a direction orthogonal to the moving direction of a document.

Since the image of a document is read out by a line sensor extending in a direction orthogonal to the moving direction of a document, an image can be read out at the most efficient sensor configuration.

According to another aspect of the present invention, an image read method includes the step of reading out an image by an image reader while a document is moved. The image reader includes a plurality of fixed read units having a different readout position in the moving direction of a document. The image read method includes the step of determining unnecessary data from read data of each read unit, and the step of averaging the read data of each read unit other than unnecessary data.

According to the present invention, unnecessary data corresponding to dust readout is determined out of the read data from the plurality of read units, and the read data other than the determined unnecessary data are averaged. Thus, an image read method that can prevent generation of a black or white streak on a readout image caused by the presence of dust at a read position, and that can improve the picture quality of the entire image with the read data averaged can be provided.

Preferably, the averaging step is carried out by adding the read data of each read unit.

Averaging is facilitated since the read data of each read unit is added and averaged.

Preferably, the determination step determines unnecessary data by comparing the value of the read data of the read unit with a predetermined threshold value.

Accordingly, unnecessary data can be determined easily and appropriately since unnecessary data is determined according to comparison with the predetermined threshold value.

Preferably, the read unit includes a line sensor extending in a direction orthogonal to the moving direction of the document.

Since the image of a document is read by a line sensor extending in a direction orthogonal to the moving direction of the document, an image can be read out at the most efficient sensor configuration.

According to another aspect of the present invention, an image read apparatus includes an image reader reading out an image with a document moved, a mode set unit setting at least one mode from a plurality of modes, a threshold value set unit setting a threshold value according to the mode set by the mode set unit, and a determination unit determining unnecessary data from the data read out from the image reader by comparing the value of the read data of the image reader with the threshold value set by the threshold value set unit.

According to the present invention, unnecessary data is determined from the data read out from the image reader based on the comparison result with a threshold value appropriately set according to the mode. Therefore, unnecessary data can be determined appropriately to prevent generation of a black or white streak.

Preferably, the image read apparatus further includes a data table in which a plurality of modes and a threshold value are stored in correspondence. The threshold value set unit refers to the data table to set the threshold value.

Since a threshold value corresponding to the mode is prestored as a data table, an appropriate threshold value can be set easily.

Preferably, the plurality of modes include at least one of a plurality of modes set according to the type of the document image, a plurality of modes set according to the amount of exposure of the image reader, and a plurality of modes set according to the type of dust adhering to the image reader.

Accordingly, a threshold value is set according to parameters that greatly affect dust detection such as the type of document image, the amount of exposure of the image reader, and the type of dust. Thus, a more appropriate threshold value can be set to prevent generation of a black or white streak.

Preferably, the image reader includes a plurality of fixed read units having a different readout position with respect to the moving direction of the document.

A document is read out by a plurality of fixed read units having a different readout position with respect to the moving direction of the document. Therefore, a plurality of read data can be obtained to determine unnecessary data therefrom more appropriately.

Preferably, the image unit includes a line sensor extending in a direction orthogonal to the moving direction of a document.

Since the image of a document is read out by a line sensor extending in a direction orthogonal to the moving direction of the original, an image can be read out at the most efficient sensor configuration.

According to still another aspect of the present invention, an image read method includes the step of reading out an image by an image reader with a document moved, the step of setting at least one mode from a plurality of modes, the step of setting a threshold value according to the set mode, and the step of determining unnecessary data from the read data of the image reader by comparing the value of the read data of the image reader with the set threshold value.

According to the present invention, unnecessary data is determined from the read data of the image reader according to the comparison result with a threshold value set appropriately corresponding to the mode. Therefore, unnecessary data can be determined appropriately to prevent generation of a black or white streak.

Preferably, the threshold value set step refers to a data table in which a plurality of modes and a threshold value are stored in correspondence to set a threshold value.

Since a data table in which a threshold value is stored corresponding to a mode is referred to, an appropriate threshold value can be set easily.

Preferably, the plurality of modes includes at least one of a plurality of modes set according to the type of the document image, a plurality of modes set according to the amount of exposure of the image reader, and a plurality of modes set according to the type of dust adhering to the image reader.

Accordingly, a threshold value is set corresponding to a parameter that greatly affects detection of dust such as the type of document image, the amount of exposure of the image reader, and the type of dust. Thus, a threshold value can be set more appropriately to prevent generation of a black or white streak.

Preferably, the image reader includes a plurality of fixed read units having a different readout position with respect to the moving direction of the document.

Accordingly, a document is read out by a plurality of fixed read units having a different readout position with respect to the moving direction of the document. Therefore, a plurality of read data can be obtained to determine unnecessary data more appropriately from the obtained data.

Preferably, the read unit includes a line sensor extending in a direction orthogonal to the moving direction of the document.

Accordingly, the document is read out by a plurality of fixed read units having a different readout position with respect to the moving direction of the document. Therefore, a plurality of read data can be obtained, and unnecessary data can be determined more appropriately from the obtained data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described with reference to the drawings.

Figure 1:
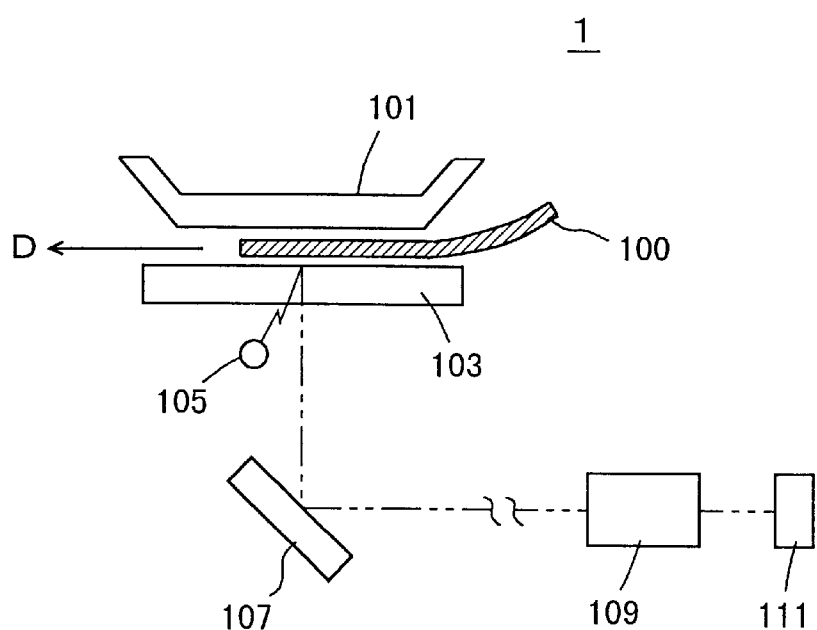
FIG. 1 is a schematic side view of a structure of an image read apparatus of the present invention.

Referring to FIG. 1, an image read apparatus 1 of the present invention includes platen glass 103, a document hold white panel 101 to hold a document 100, a light source 105 to irradiate document 100, a mirror 107 to send light reflected from document 100 to a CCD, a lens 109 to converge light reflected from mirror 107 on the CCD, and a group of a plurality of CCDs 111 to read reflected light of the document image focused by lens 109 for conversion into an electrical signal.

During a readout operation of image read apparatus 1, document 100 moves in the direction of an arrow D (sub-scanning direction) between platen glass 103 and document hold white panel 101. The fixed group of CCDs 111 sequentially read out an image from moving document 100.

Figure 2:
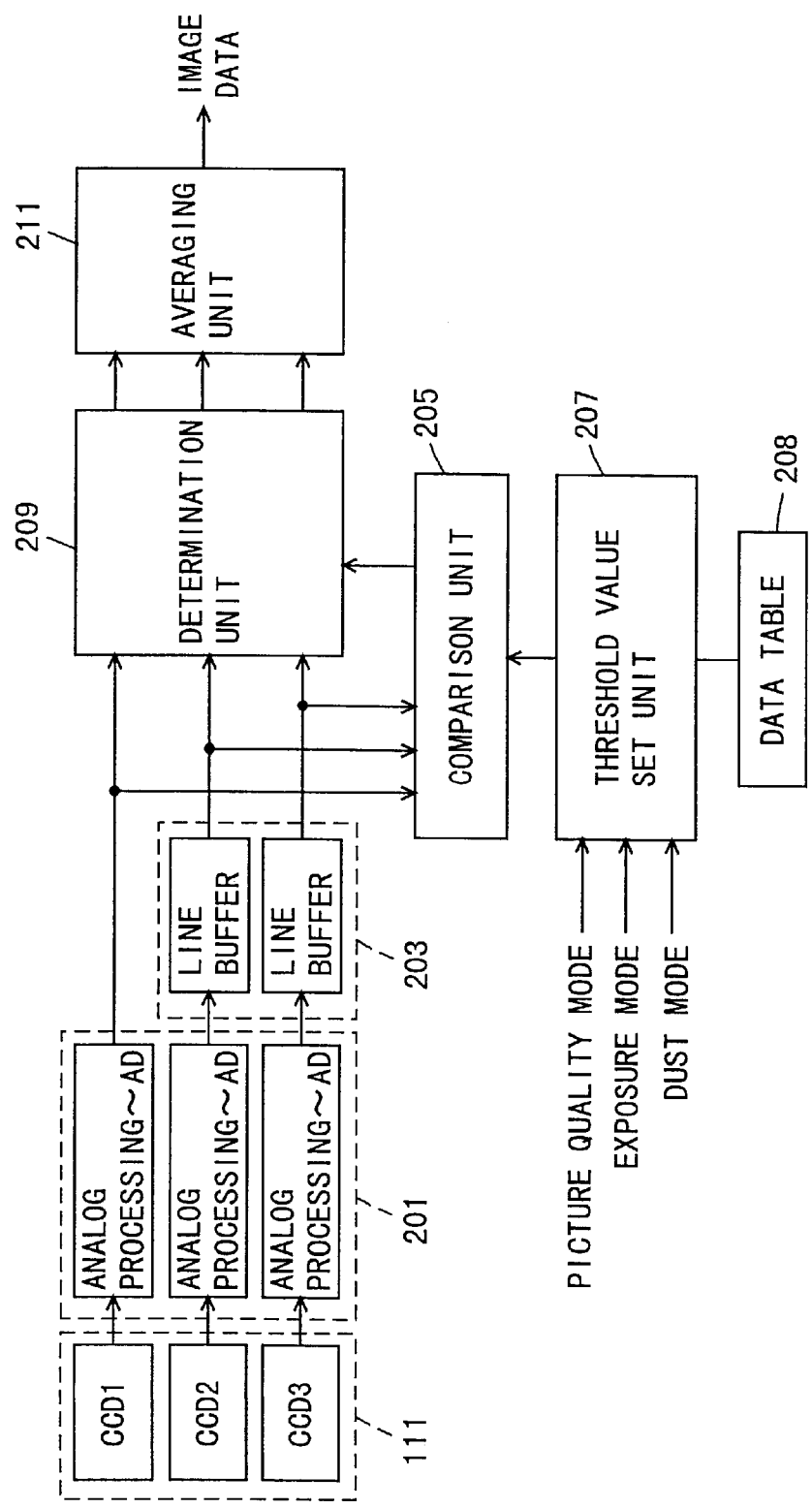
FIG. 2 is a functional block diagram associated with an image data process of the image read apparatus of FIG. 1.

FIG. 2 is a block diagram associated with the image data process of image read apparatus 1 of FIG. 1. Referring to FIG. 2, image read apparatus 1 includes CCD group 111 to read out a document image, a data processing unit 201 to carry out a predetermined analog process on the analog electrical signal from CCD group 111, and then converting the signal into digital data, a line buffer 203 to store data subjected to a predetermined process and conversion by data processing unit 201 for a predetermined time, a comparison unit 205 to compare data for the same pixel output from CCD group 111, and a threshold value set unit 207 to set a threshold value that becomes the reference for comparison by comparison unit 205.

Here, CCD group 111 is formed of three CCD 1, CCD 2 and CCD 3. Comparison unit 205 compares the data output of the same pixel from these three CCDs to compare the output data with a threshold value set by threshold value set unit 207.

Threshold value set unit 207 sets an appropriate threshold value to detect dust according to the picture quality mode (text mode or photograph mode), the exposure mode (darkest mode or middle mode or lightest mode), and the dust mode (black dust mode or white dust mode). The threshold value is set according to a data table 208 that is stored in advance.

Image read apparatus 1 further includes a determination unit 209 receiving the comparison result with a threshold value from comparison unit 205 to determine and control data sent downstream out of the data output from the three CCDs, and an averaging unit 211 averaging the data sent from determination unit 209 to output the averaged data as image data.

Determination unit 209 detects the pixel data to be rejected according to the comparison result with the threshold value to determine pixel data that is to be selected. More specifically, data of a pixel corresponding to readout of dust from the output data of each CCD (referred to as "dust data" hereinafter) is detected, and data other than the dust data is selected as the proper data.

The plurality of data for the same pixel output from CCD group 111 is averaged according to only the proper data to be eventually output as one image data.

Although three CCDs are employed as the image sensor here, the number of CCDs is arbitrary as long as there are two CCDs. Employment of more CCDs will correspond to the addition (averaging) of more data values to increase the SN ratio. Accordingly, the picture quality is improved.

Figure 3:
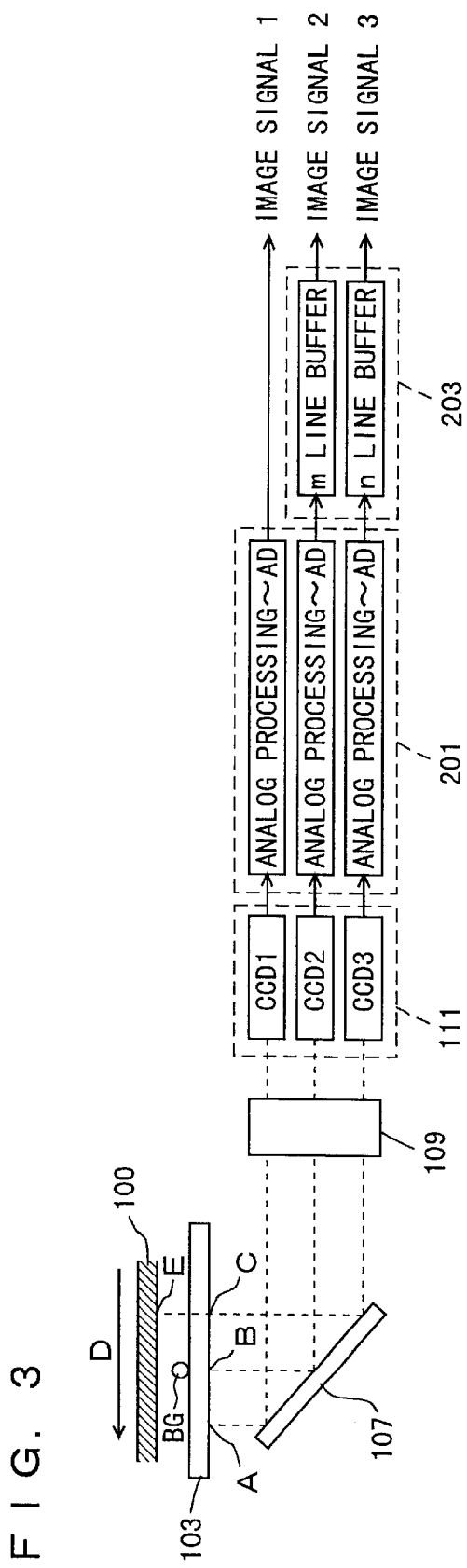
FIG. 3 is a schematic diagram to describe the relationship between the readout position of a document image and a group of plurality of CCDs.

FIG. 3 is a schematic diagram to describe the relationship between the readout position of a document image and a group of plurality of CCDs 111. The direction perpendicular to the paper sheet of the drawing is the main scanning direction of the CCD, and the direction of arrow D is the sub-scanning direction.

Referring to FIG. 3, document 100 is moved in the direction of arrow D. Each of the three lines of CCD group 111 (CCD 1, CCD 2 and CCD 3) reads this document image at a different position. The analog data output from each CCD is subjected to a predetermined analog process and A/D conversion at data processing unit 201 to be eventually output as digital image signals 1, 2 and 3.

The readout position of CCD 1 is the line position in the main scanning direction on platen glass 103 passing point A on platen glass 103. The readout position of CCD 2 is the line position passing point B. The readout position of CCD 3 is the line position passing point C. Therefore, an image of different line positions of document 100 is read out at the same time. As document 100 moves, the image of the same line position, i.e., the same pixel, is read out shifted by every predetermined time.

More specifically, the line position of point E of document 100 is read out by CCD 3 at a predetermined time (t=t0). Since document 100 moves at a constant speed, CCD 2 reads out the same line position of point E at an elapse of a predetermined time (t=t1), and then CCD 1 reads out the same position at an elapse of a predetermined time (t=t2).

In order to obtain at the same time the image of the same position read out at a different time, two line buffers 203 are used to buffer the foregoing time difference. More specifically, one is the n line buffer storing data output from CCD 3 to buffer the time difference starting from the readout of the image at the line of point E by CCD 3 up to the readout of the image of the line of point E by CCD 1 ($\delta t3=t2-t0$). The other is the m line buffer to store data output from CCD 2 to buffer the time difference starting from the readout of the image at the line of point E by CCD 2 up to the readout of the image at the line of point E by CCD 1 ($\delta t2=t1-t0$).

By the usage of line buffer 203, the data output from CCD 2 and CCD 3 are temporarily stored until the data for the same position is obtained from the last CCD 1 reading the image data. The data from CCD 1 (image signal 1) and the data obtained via line buffer 203 (image signals 2 and 3) correspond to image data for the same pixel. There are output at the same time.

Consider the case where a black dust BG adheres on platen glass 103 in FIG. 3. Dust is generally carried adhering to the document that passes along platen glass 103. The dust may drop off during readout by friction with the document to be discharged outside, or may be firmly fastened to remain at the same position. The size of the dust generally corresponds to approximately 1–4 pixels for a readout system of 400 dpi and approximately 1–6 pixels for a readout system of 600 dpi.

It is assumed here that black dust BG adheres to platen glass 103, not directly to document 100. Accordingly, CCD 2 corresponding to the readout position of B on platen glass 103 reads out black dust BG whereas CCD 1 and CCD 3 corresponding to the readout positions of A and C, respectively, do not read out black dust BG.

Therefore, only CCD 2 cannot read out the reflected light of the original (document image) corresponding to several pixels in the main scanning direction due to the presence of black dust BG. Black data will be obtained instead. This is recognized as a black streak in the sub-scanning direction.

Figure 4:
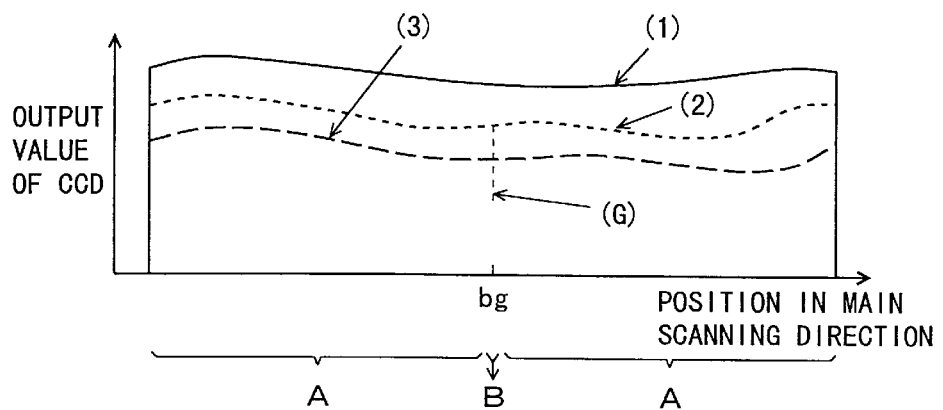
FIG. 4 is a waveform diagram of image signals corresponding to adherence of black dust at the platen glass of FIG. 3 in analog representation.

FIG. 4 shows the waveform of image signals 1–3 in analog representation in the case where black dust BG adheres to platen glass 103 in FIG. 3. For the sake of simplification, respective image signals are depicted shifted in the direction of the vertical axis.

Here, the horizontal axis corresponds to the position of the CCD in the main scanning direction whereas the vertical axis corresponds to the output values of the CCD. Analog waveforms (1)–(3) correspond to image signals 1, 2 and 3, respectively, of FIG. 3.

Since black dust BG adheres at a position bg in the main scanning direction on platen glass 103, light reflected from the document will not reach CCD 2 at this position. Therefore, the output value of the CCD for that region is small. Waveform (2) of image signal 2 is extremely reduced at position bg (G).

In contrast, CCD 1 and CCD 3 are not affected by black dust BG, and directly receive the reflected light from the document. Therefore, waveform (1) of image signal 1 and waveform (3) of image signal 3 at position bg have no particular reduction, and exhibit normal values corresponding to the density of the document.

The portion indicated by A unaffected by black dust BG has the output values of all the three lines of CCDs added. Here, the SN ratio increases $\sqrt{3}$ times in comparison to the case where the document image is read out by only one line of CCD. Therefore, the picture quality is improved.

The portion indicated by B affected by black dust BG has the output value from CCD 2 rejected. The data of only CCD 1 and CCD 3 are added, so that generation of a black streak is prevented.

Since the portion of B corresponds to several pixels, the difference in picture quality between the portion of A and the portion of B cannot be recognized visually. Thus, the entire picture quality is improved.

In the case where picture quality is to be obtained of a level identical to that when a CCD of one line is used, the intensity of the light source can be dropped to $1/3$ to reduce energy consumption.

Figure 5:
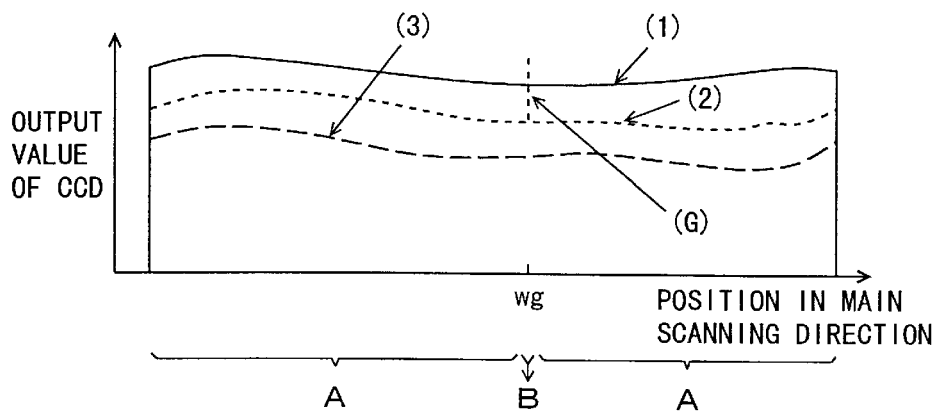
FIG. 5 is a waveform diagram of image signals corresponding to adherence of white dust at the platen glass of FIG. 3.

FIG. 5 shows the waveform of image signals 1–3 when a white dust WG adheres to platen glass 103 in FIG. 3 in analog representation. As in FIG. 4, the horizontal axis corresponds to the position of the CCD in the main scanning direction whereas the vertical axis corresponds to respective output values of the CCD. The analog waveforms of image signals 1–3 are shifted in the direction of the vertical axis.

Since white dust WG adheres to a position wg on platen glass 103 in the main scanning direction, light reflected from the document will not arrive at this position. Therefore, CCD 2 reads out white dust WG. Waveform (2) of image signal 2 protrudes greatly at position wg (G).

The outputs from CCD 1 and CCD 3 exhibit normal values corresponding to the density of the document at position wg, unaffected by white dust WG.

Therefore, at portion A that is not affected by the white dust, the output values of the three CCDs are added. At the portion of B affected by the white dust, the output values of two lines are added. Therefore, the picture quality of the entire output image is improved.

Figure 6:
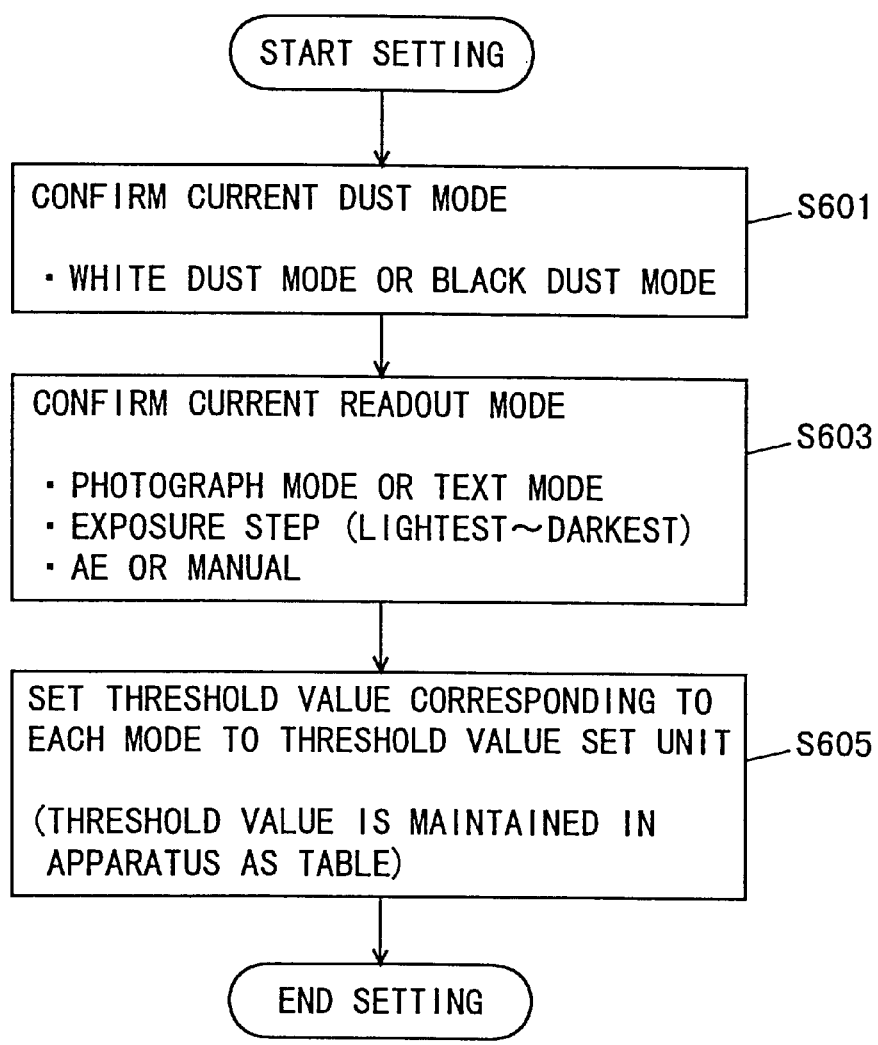
FIG. 6 is a flow chart of a process of setting a threshold value by the threshold value set unit of FIG. 2.

FIG. 6 is a flow chart of the process of setting the threshold value at threshold value set unit 207 of FIG. 2. At step S601 in FIG. 6, confirmation is made whether the current dust mode is the white dust mode or the black dust mode. Here, the currently set dust mode is input as a parameter.

At step S603, confirmation is made of the current readout mode. More specifically, confirmation is made whether the current readout mode is the picture quality mode (photograph mode or text mode) or the exposure step (lightest mode or middle mode or darkest mode). The confirmed readout mode is input as a parameter.

At step S605, a threshold value corresponding to each mode is set. Here, the threshold value is prestored in the apparatus as table data. Based on the parameters of the input dust mode and readout mode of steps S601 and S603, data table 208 is referred to, and an appropriate threshold value is set automatically.

Figure 7:
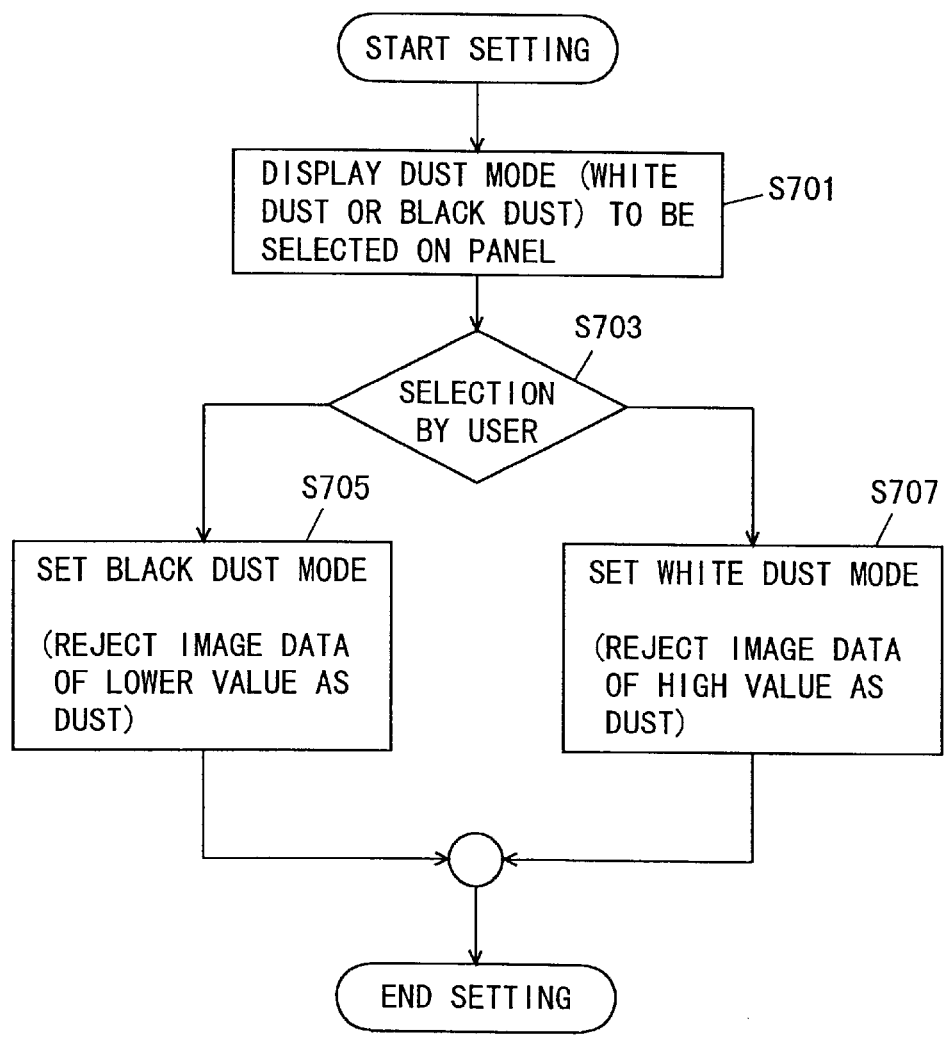
FIG. 7 is a flow chart of a process when a dust mode is set.

FIG. 7 is a flow chart of the process when the dust mode is set. These processes, i.e., the specification of the defect of the image data to be removed (appearing as a black streak or a white streak on the output image) is carried out before image readout. At step S701 in FIG. 7, the selected dust mode, i.e. the white dust mode or the black dust mode, is displayed on the panel of image read apparatus 1.

At step S703, the user selects the dust mode. Defect of the image data to be removed is specified by the user.

When the black dust mode is specified, control proceeds to step S705 to set the black dust mode where image data corresponding to a low output value from the CCD is rejected as dust. Here, the black dust mode is set if no specification is made. The black dust mode is set as the default since the defect of a white streak where the print black character is reproduced as no-print white occurs at a lower frequency than the defect of a black streak.

When the white dust mode is specified, control proceeds to step S707 to set the white dust mode where the image data corresponding to a high output value from the CCD is rejected as dust.

Thus, the dust mode is specified prior to reading the dust mode at step S601 of FIG. 6.

The relationship between each mode and the accordingly set threshold value will be described with reference to FIGS. 8–13.

First, the principle of setting the threshold value according to the picture quality mode out of the readout mode will be described with reference to FIGS. 8 and 9.

Figure 8:
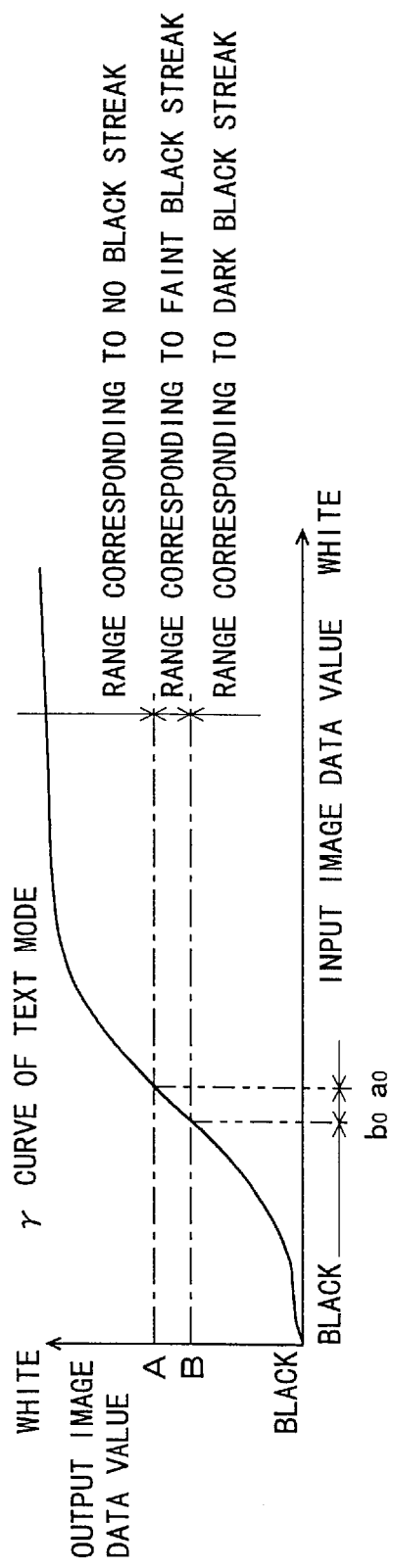
FIGS. 8 and 9 are diagrams to describe threshold value setting of black dust data removal in a text mode and a photograph mode, respectively.

FIG. 8 is a diagram to describe the case where the threshold value to remove black dust data in a character mode is specified. Here, the horizontal value corresponds to the input image data value, and the vertical axis corresponds to the output image data value.

Referring to FIG. 8, edge enhancement is applied intensively since an image with sharp black and white is required in a text mode. Therefore, the γ curve is sharp as in FIG. 8, and the output image data exhibits a low value (a value more close to black) even for a relatively high input data value (a value more close to white). Therefore, even if the data value corresponding to dust read out exhibits a relatively high value (value more close to white), a black streak will appear in the output image.

Here, a dark black streak appears when the output image data value is B or below. When the output image data is greater than B and not higher than A, a faint black streak appears. When the output image data value is greater than A, no black streak appears. Therefore, appearance of a black streak depends upon whether the output image data value is greater than A or not. Thus, input image data value a0 corresponding to the lower limit output image data value A that does not exhibit a black streak is set as the threshold value to detect dust.

In the case where the set input image data value is equal to or lower than a0, the image data is determined to be dust data, and will correspond to the reject image data of determination unit 209. In the case where the input data value is greater than a0, determination is made of the normal document image data to be included as the image data sent downstream by determination unit 209.

Figure 9:
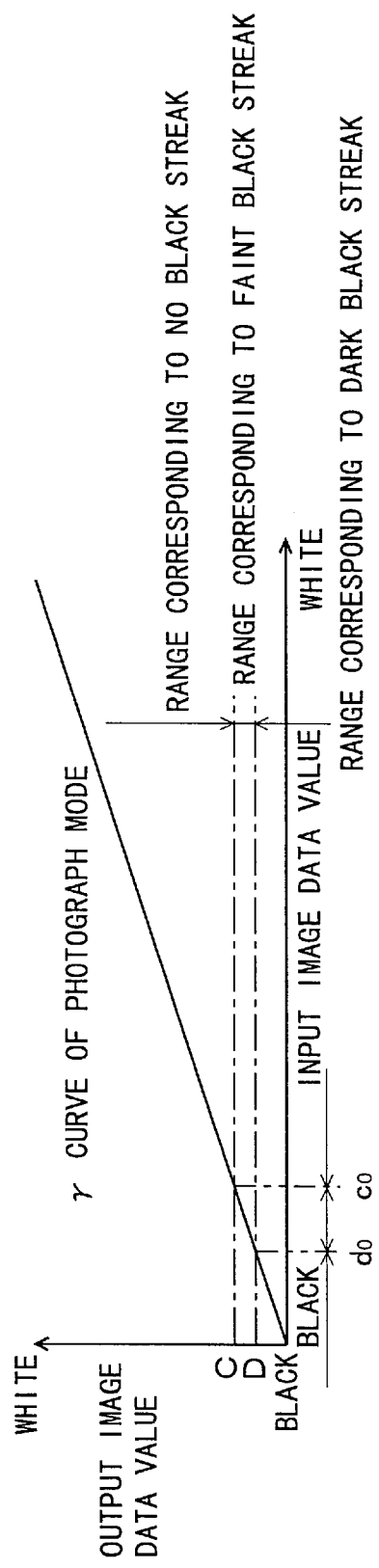

FIG. 9 is a diagram to describe the case where the threshold value is set to remove black dust data in a photograph mode. Referring to FIG. 9, a smoothing process is applied in the photograph mode in contrast to the text mode. This is because a smooth image of favorable gradation is required in the photograph mode. This means that a relatively small dust that becomes the cause of a black streak will be suppressed from appearing in the output image by the smoothing process even if the input image data value is rather low (a value more close to black).

Here, a dark black streak appears when the output image data value is equal to or lower than D (D<B). A faint black streak appears when the output image data value is greater than D and not higher than C (C<A). Therefore, a black steak will not appear if the output image data value is greater than C. Thus, appearance of a black streak depends upon whether the output image data value is greater than C or not. Thus, an input image data value c0 corresponding to the lower limit output image data value C that does not exhibit a black streak is set as the threshold value for dust detection.

As a result, a threshold value lower than that of the text mode (a threshold value corresponding to the black side) is set in the photograph mode (c<a). Thus, determination is made of dust data with an input image data value more close to black.

The principle of setting the threshold value according to the exposure mode (exposure step) out of the readout mode will be described with reference to FIGS. 10 and 11.

Figure 10:
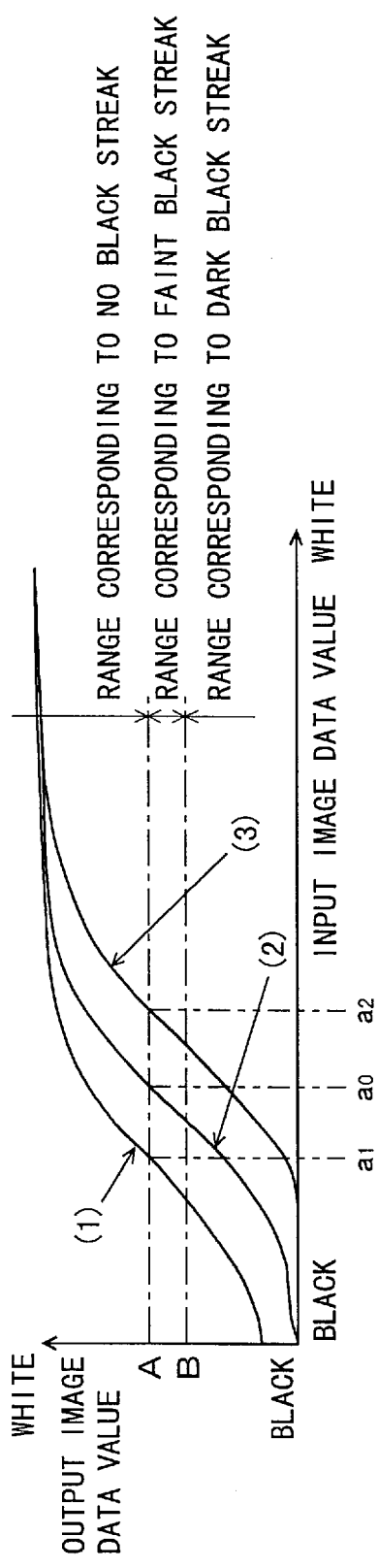
FIGS. 10 and 11 are diagrams to describe the case where the threshold value for removing black dust data in a text mode and a photograph mode, respectively, is set according to the exposure mode.

FIG. 10 is a diagram to describe the case where the threshold value for black dust data removal in a text mode is set according to the exposure mode. Likewise FIGS. 8 and 9, the horizontal axis corresponds to the input image data value whereas the vertical axis corresponds to the output image data value. Here, the γ curves of (1), (2) and (3) represent the case where the exposure mode is the darkest mode, the middle mode, and the lightest mode, respectively. γ curve (2) of the middle mode corresponds to the γ curve of FIG. 8.

Referring to FIG. 10, the input image data value corresponding to output image data value A is set as the threshold value similar to the foregoing method of setting the threshold value since the range of a black streak corresponds to an output image data value of A or below in a text mode. More specifically, the threshold value is set to a0 when the exposure mode is the middle mode. The threshold value is set to a1 by γ curve (1) when the exposure mode is the darkest mode. The threshold value is set to a2 by γ curve (3) when the exposure mode is the lightest mode.

Figure 11:
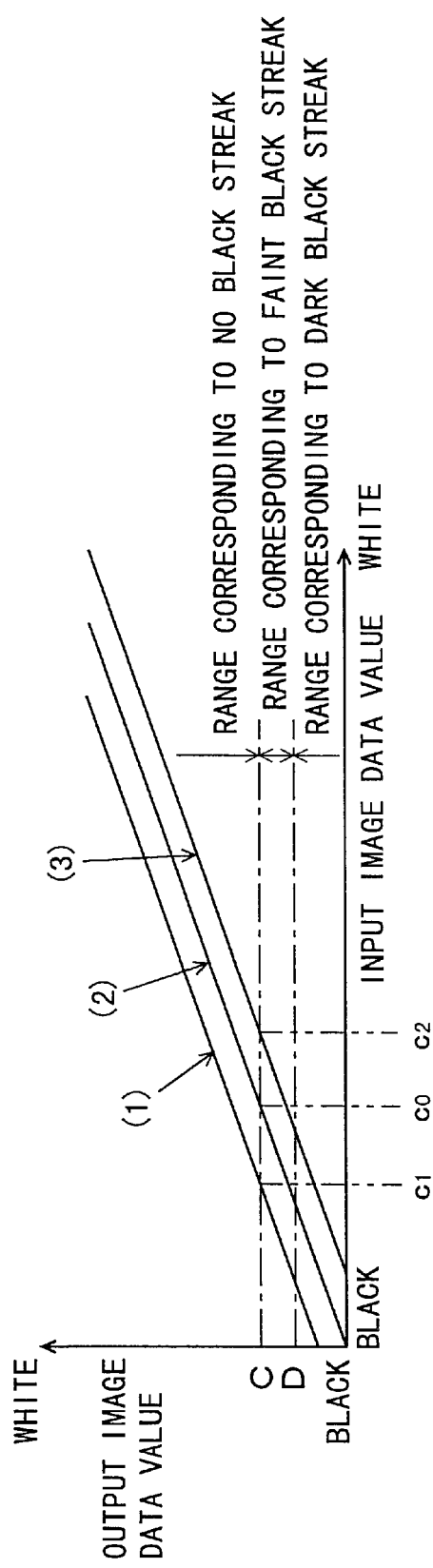

FIG. 11 is a diagram to describe the case where the threshold value of black dust data removal in a photograph mode is set according to the exposure mode. (1), (2) and (3) represent the γ curve when the exposure mode is the darkest mode, the middle mode, and the lightest mode, respectively. γ curve (2) of the middle mode corresponds to the γ curve of FIG. 9.

Referring to FIG. 11, the input image data value corresponding to output image data value C is set as the threshold value similar to the foregoing method of setting the threshold value since the range of a black streak corresponds to the output image data value of C or below in a photograph mode. More specifically, the threshold value is set to c0 when the exposure mode is the middle mode. The threshold value is set to c1 by γ curve (1) when the exposure mode is the darkest mode. The threshold value is set to c2 by γ curve (3) when the exposure mode is the lightest mode.

The principle corresponding to the case where the threshold value is set according to the dust mode will be described with reference to FIGS. 12 and 13.

Figure 12:
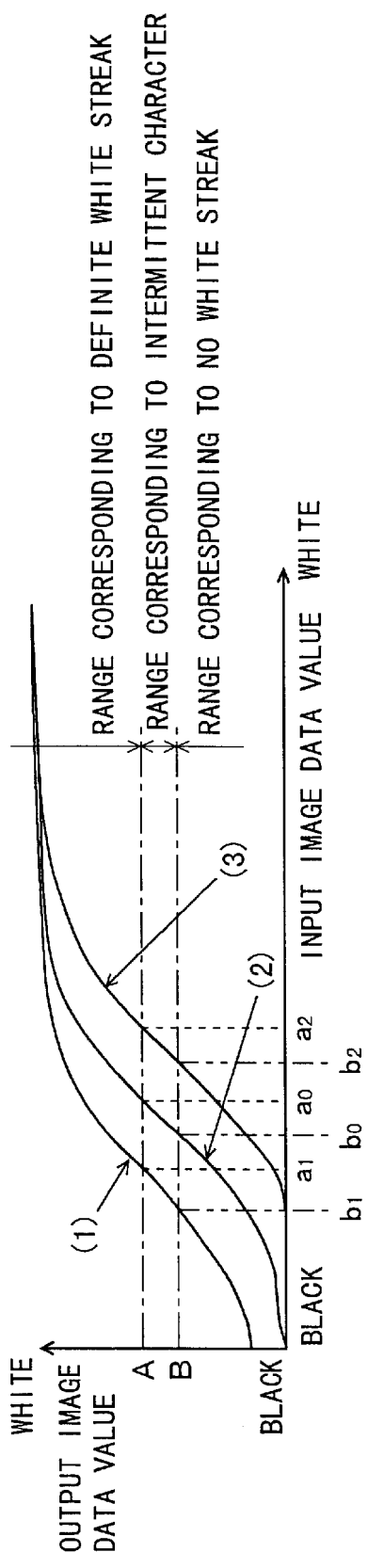
FIGS. 12 and 13 are diagrams to describe the case where the threshold value of removing white dust data in a text mode and a photograph mode, respectively, is set according to the exposure mode.

FIG. 12 is a diagram to describe the case where the threshold value of white dust data removal in a text mode is set according to the exposure mode. The horizontal axis corresponds to the input image data value whereas the vertical axis corresponds to the output image data value. (1), (2) and (3) represent the γ curve when the exposure mode is the darkest mode, the middle mode, and the lightest mode, respectively.

It is appreciated from FIG. 12 that the range of the output image data value where a white streak appears is opposite to the range where a black streak appears shown in FIGS. 8 and 10. Although a white streak will not appear if the output image data value is equal to or less than B, the image of a character or the like will appear intermittently (not distinctly, but with white streaks) if the output image data value is greater than B and not higher than A. If the output image data value is greater than A, definite white streaks appear.

Therefore, generation of a white streak depends whether the output image data value is higher or lower than B. Similar to the principle of the black dust mode, the input image data value corresponding to the upper limit output image data value B not exhibiting a white streak is selected as the threshold value to be set. More specifically, the threshold value of b1, b0 and b2 is set when in the darkest mode, the middle mode, and the lightest mode, respectively. Therefore, a threshold value differing from that set (a0, a1, a2) for the black dust mode is set even if the same text mode and exposure mode are set, as shown in FIG. 10.

Figure 13:
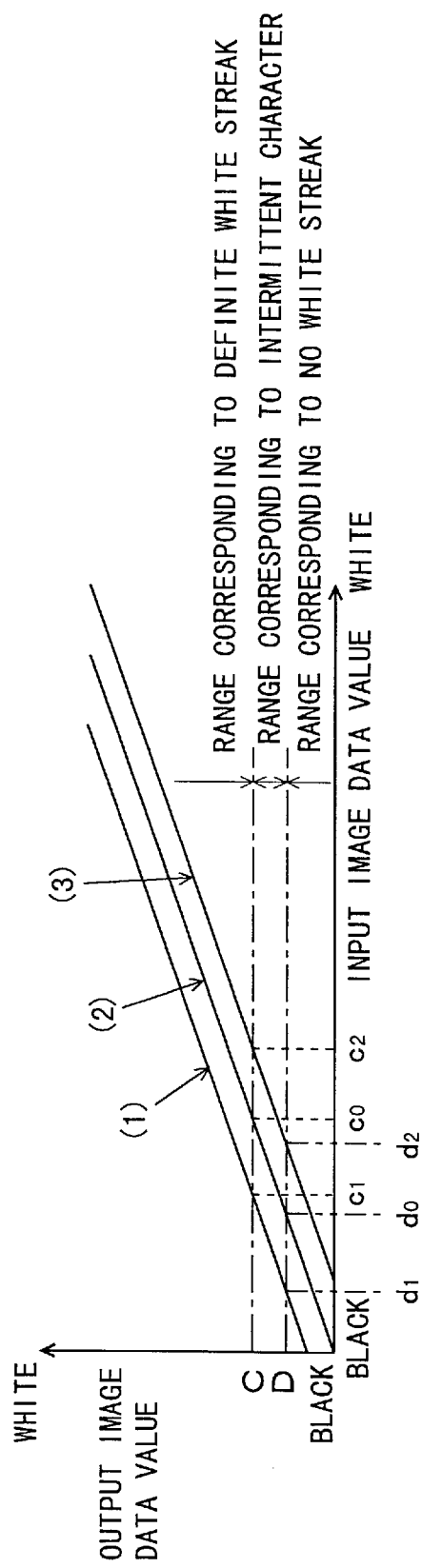

FIG. 13 is a diagram to describe the case where the threshold value of white dust data removal in a photograph mode is set according to the exposure mode. (1), (2) and (3) represent the γ curve when the exposure mode is the darkest mode, the middle mode, and the lightest mode, respectively.

It is appreciated from FIG. 13 that the range of the output image data value exhibiting a white streak is opposite to the range where a black streak appears shown in FIGS. 9 and 11. In other words, a white streak will not appear if the output image data value is D or below. When the output image data value is greater than D and not more than C, the image of the character or the like will appear intermittently. When the output image data value is greater than C, a definite white streak appears.

Therefore, generation of a white streak depends upon whether the output image data value D is higher or lower than D. Therefore, the input image data value corresponding to the upper limit output image data value D that does not exhibit a white streak is selected as the threshold value to be set. More specifically, the threshold value of d1, d0 and d2 is selected when the exposure mode is the darkest mode, the middle mode, and the lightest mode, respectively.

Therefore, in the white dust mode, a threshold value differing from that set in the black dust mode (c1, c0, c2 (refer to FIG. 11)) is set even when the same photograph mode and exposure mode are set.

By changing the threshold value depending upon a black dust mode or a white dust mode according to the above-described principle, the black dust data (G) of FIG. 4 and the white dust data (G) of FIG. 5 can be removed appropriately.

Figures 14, 15:
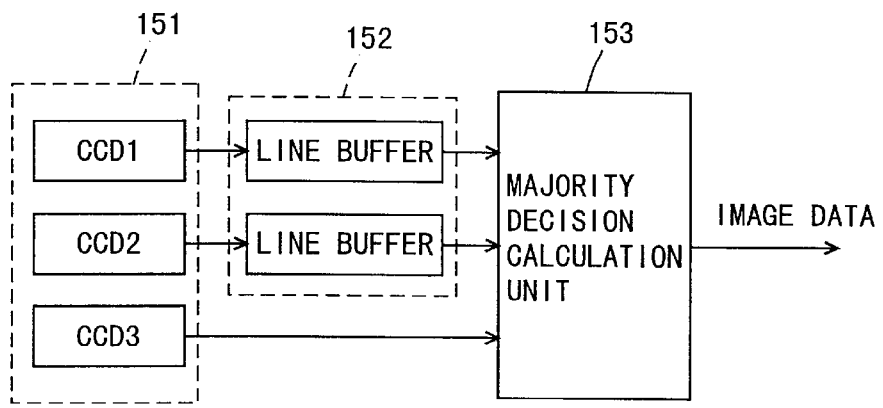
FIG. 14 shows an example of a data table referred to in setting a threshold value according to the mode by the threshold value set unit.
FIG. 15 is a block diagram showing a schematic structure of a conventional image read apparatus.

FIG. 14 shows an example of a data table 208 that is referred to for threshold value set unit 207 setting a threshold value according to the mode. Data table 208 is prestored in image read apparatus 1. Referring to FIG. 14, the threshold value is determined as described above with the dust mode, the picture quality mode and exposure mode as parameters.

For example, when the dust mode is the black dust mode, the picture quality mode is the text mode, and the exposure mode is the lightest mode, the threshold value is set to "a2" (refer to FIG. 10). When in the white dust mode, photograph mode and darkest mode, the threshold value is set to "d1" (refer to FIG. 15).

By setting an appropriate threshold value according to the mode, dust data can be detected (removed) appropriately.

Although three types are employed as the modes for the parameters, the number of types may be more or less. Therefore, only the picture quality mode, or only the picture quality mode and the exposure mode may be employed as the parameters. The memory capacity can be reduced by minimizing the parameters. Also, the threshold value can be obtained more easily.

Other conditions such as the resolution and the printer type can be added as parameters. The addition of parameters allows a more appropriate threshold value to be set. Only other conditions may be employed as parameters.

Instead of using data table 208, the threshold value can be obtained from a function expression or the like.

Instead of using a threshold value, the dust data, i.e. the data to be rejected, can be determined by comparing the data with each other for the same pixel.

Although the pixel corresponding to the readout of dust (dust data) is rejected in the present embodiment, the entire relevant line data can be rejected. In FIG. 4, for example, the portion indicated by A uses the output values of the three lines of CCDs, and only the portion indicated by B employs the output values of two lines of CCDs. In the case where there is only one line of the CCD having the dust located at the readout position, the output data can be rejected for each entire line and obtain the output image data by two lines of CCDs for all the portions.

By setting the number of data to be averaged constant independent of the region, the output image data can be obtained more easily. Since the output values from two lines of CCDs are added in this case, the picture quality is improved than the case where the image is read out with only one line.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image read apparatus comprising:
   an image reader reading out an image with a document moved, said image reader including a plurality of fixed read units having a different readout position with respect to a moving direction of said document, each fixed read unit being configured to read and output read data of a common pixel at each of the different readout positions;
   a determination unit determining unnecessary data from said read data output from said each fixed read unit; and
   an averaging unit averaging said read data from said each fixed read unit other than said unnecessary data to provide an averaged data corresponding to said common pixel.

2. The image read apparatus according to claim 1, wherein said averaging unit carries out averaging by adding said read data output from said each fixed read unit.

3. The image read apparatus according to claim 1, wherein said determination unit determines said unnecessary data by comparing a value of the read data output from said each fixed read unit with a predetermined threshold value.

4. The image read apparatus according to claim 1, wherein said each fixed read unit includes a line sensor extending in a direction orthogonal to the moving direction of said document.

5. An image read method comprising the steps of:
   reading out an image by an image reader with a document moved, said image reader including a plurality of fixed read units having a different readout position with respect to a moving direction of said document, each fixed read unit being configured to read and output read data of a common pixel at each of the different readout positions;
   determining unnecessary data from said read data output from said each fixed read unit; and
   averaging said read data from said each fixed read unit other than said unnecessary data to provide an averaged data corresponding to said common pixel.

6. The image read method according to claim 5, wherein said averaging step carries out averaging by adding said read data output from said each fixed read unit.

7. The image read method according to claim 5, wherein said determination step determines said unnecessary data by comparing a value of the read data output from said each fixed read unit with a predetermined threshold value.

8. The image read method according to claim 5, wherein said each fixed read unit includes a line sensor extending in a direction orthogonal to the moving direction of said document.

9. An image read apparatus comprising:
   an image reader reading out an image with a document moved,
   a mode set unit setting at least one mode from a plurality of modes,
   a threshold value set unit setting a threshold value according to the mode set by said mode set unit, and
   a determination unit determining unnecessary data from read data of said image reader by comparing a value of read data of said image reader with a threshold value set by said threshold value said unit.

10. The image read apparatus according to claim 9, further comprising a data table having said plurality of modes and a threshold value stored in correspondence,
    wherein said threshold value set unit refers to said data table to set said threshold value.

11. The image read apparatus according to claim 9, wherein said plurality of modes includes at least one of a plurality of modes set according to a type of a document image, a plurality of modes set according to an exposure amount of said image reader, and a plurality of modes set according to a type of dust adhering to said image reader.

12. The image read apparatus according to claim 9, wherein said image reader comprises a plurality of fixed read units having a different readout position with respect to a moving direction of said document.

13. The image read apparatus according to claim 12, wherein said read unit includes a line sensor extending in a direction orthogonal to the moving direction of said document.

14. An image read method comprising the steps of:

reading out an image by an image reader with a document moved, setting at least one mode from a plurality of modes, setting a threshold value according to said set mode, and determining unnecessary data from read data of said image reader by comparing a value of the read data of said image reader with said set threshold value.

15. The image read method according to claim 14, wherein said threshold value set step refers to a data table in which said plurality of modes and a threshold value are stored in correspondence to set said threshold value.

16. The image read method according to claim 14, wherein said plurality of modes includes at least one of a plurality of modes set according to a type of a document image, a plurality of modes set according to an exposure amount of said image reader, and a plurality of modes set according to a type of dust adhering to said image reader.

17. The image read method according to claim 14, wherein said image reader comprises a plurality of fixed read units having a different readout position with respect to a moving direction of said document.

18. The image read method according to claim 17, wherein said read unit includes a line sensor extending in a direction orthogonal to the moving direction of said document.

* * * * *